United States Patent

Karube et al.

Patent Number: 6,055,263
Date of Patent: Apr. 25, 2000

[54] SOLID-STATE LASER OSCILLATING DEVICE

[75] Inventors: Norio Karube, Machida; Nobuaki Iehisa, Mishima; Kenji Mitsui, Asaka, all of Japan

[73] Assignee: Fanuc Ltd., Yamanashi, Japan

[21] Appl. No.: 08/930,345

[22] PCT Filed: Feb. 3, 1997

[86] PCT No.: PCT/JP97/00260

§ 371 Date: Sep. 30, 1997

§ 102(e) Date: Sep. 30, 1997

[87] PCT Pub. No.: WO97/28585

PCT Pub. Date: Aug. 7, 1997

[30] Foreign Application Priority Data

Feb. 2, 1996 [JP] Japan .................................. 8-039092

[51] Int. Cl.[7] .................................. H01S 3/07; H01S 3/16
[52] U.S. Cl. .................................................. 372/97; 372/68
[58] Field of Search ............................ 372/39–42, 66, 372/68, 92, 97

[56] References Cited

U.S. PATENT DOCUMENTS

| | | | |
|---|---|---|---|
| 4,125,816 | 11/1978 | Boling et al. ............................. | 372/68 |
| 4,173,738 | 11/1979 | Boling et al. ........................ | 372/68 X |
| 5,274,650 | 12/1993 | Amano ................................. | 372/68 X |
| 5,289,482 | 2/1994 | Esterowitz et al. ........................ | 372/41 |
| 5,548,606 | 8/1996 | Senn et al. ................................. | 372/39 |
| 5,808,793 | 9/1998 | Chang et al. ............................. | 359/484 |

FOREIGN PATENT DOCUMENTS

| | | |
|---|---|---|
| 50-2492 | 1/1975 | Japan . |
| 51-128292 | 11/1976 | Japan . |
| 3-145776 | 6/1991 | Japan . |
| 5-291654 | 11/1993 | Japan . |
| 7-288352 | 10/1995 | Japan . |
| 8-111552 | 4/1996 | Japan . |

*Primary Examiner*—John D. Lee
*Attorney, Agent, or Firm*—Staas & Halsey, LLP

[57] ABSTRACT

A solid-state laser oscillating device which is inexpensive and capable of obtaining a high power. A plurality of laser crystals (YAG laser crystals, etc.) (1a, 1b, 1c) are arranged along the optical axis of an optical resonator so as to maintain optical contact with one another. Adjacent ones of the laser crystals have surfaces facing each other with an adhesive layer (10, 20) interposed therebetween, to form an array in a straight-line as a whole. An adhesive having a low light absorbance with respect to a laser beam of oscillation wavelength or an excitation light is used for forming the adhesive layers (10, 20). If the refractive index of the adhesive is substantially equal to that of the laser crystals, optical matching is achieved. The adhesive layers (10, 20) may be replaced by some other transparent material. The adjacent laser crystals may be arranged with a narrow gap therebetween or held in surface contact with each other.

11 Claims, 3 Drawing Sheets

6,055,263

SOLID-STATE LASER OSCILLATING DEVICE

TECHNICAL FIELD

The present invention relates to a solid-state laser oscillating device to be equipped and used in a laser machining apparatus or the like.

BACKGROUND ART

Solid-state laser oscillating devices such as YAG (yttrium-aluminum-garnet) lasers are capable of providing a high-power and stable laser beam, and thus are widely used in laser machining apparatuses for carrying out cutting, welding, etc. of metallic or nonmetallic materials. FIG. 4 is a schematic diagram illustrating a structure of a slab-type YAG laser oscillating device as an example of a conventional solid-state laser oscillating device.

In FIG. 4, a laser crystal (YAG laser crystal) 1 is disposed in a reflector 30 together with excitation lamps L1 and L2 each comprising a xenon lamp, for example. A total reflection mirror M1 and a partial reflection mirror M2 are arranged at opposite ends of the laser crystal 1, respectively, thereby constituting a Fabry-Perot type optical resonator. Inner walls 31 of the reflector 30 have surfaces of high light reflectivity.

Cooling water (pure water) is circulated through an interior of the reflector 30 to prevent overheating of individual parts of the device, including the laser crystal, the excitation lamps, the reflector, etc., thereby preventing the quality of a laser beam from being lowered due to the rise of temperature. Arrows C1 and C2 indicate an inlet and an outlet, respectively, of the circulating cooling water. The excitation lamps L1 and L2 are energized by an excitation power supply 40 and radiate excitation light 50.

The excitation light 50 radiated from the excitation lamps L1 and L2 falls upon the laser crystal 1 directly or indirectly after being reflected by the high-reflectivity inner walls 31 of the reflector 30, whereupon the laser crystal 1 is subjected to pumping to generate a laser beam S. The laser beam is amplified while traveling in the space of the optical resonator back and forth between the total reflection mirror M1 and the partial reflection mirror M2, and a part S' thereof is let out and used for the purpose of laser beam machining or the like.

A surface of the laser crystal 1 is in direct contact with the air or the cooling water (pure water). Accordingly, incoming and outgoing of light to and from the laser crystal 1 take place through an interface between the laser crystal 1 and the air or the cooling water (pure water). Naturally, there is a considerably large difference in refractive index between the laser crystal 1 and the air or the cooling water (pure water). Thus, in order to keep an efficiency of the optical resonator high, the laser crystal 1 has its opposite end faces 2 and 3 obliquely cut at an angle substantially satisfying the Brewster's condition. In the case of the YAG laser crystal, the Brewster's angle is ranging approximately from 60 to 62 degrees, and therefore the opposite end faces 2 and 3 of the laser crystal 1 are individually inclined at an angle θ of approximately 28 to 30 degrees in the illustrated example where the total reflection mirror M1, the laser crystal 1 and the partial reflection mirror M2 are arranged in a straight line.

Using a slab-type laser crystal, an optical path can be formed in zigzag within the laser crystal 1, as indicated by the broken line in the figure. A zigzag optical path in the laser crystal 1 is advantageous in preventing the quality of the laser beam from being lowered due to a refractive index gradient caused in the laser crystal 1. Specifically, in the laser crystal, a temperature distribution is liable to be present such that the temperature is lowered with distance from a central axis of the crystal toward the periphery, to cause a corresponding concentric profile of refractive index inside the laser crystal. Accordingly, if the optical path in the laser crystal 1 is made straight, a difference in optical-path length is caused depending on radial locations in the laser crystal where the laser beam passes back and forth, to adversely affect the optical resonation. Contrary, with the zigzag optical path, lengths of the optical paths of the laser beams traveling back and forth are averaged so that it is hard to cause the difference in the optical-path lengths. In the case where the opposite end faces of the laser crystal are inclined, the optical path can be made to zigzag within the laser crystal even if an angle of the inclination of the end faces does not satisfy the Brewster's condition.

As the laser crystal 1, a rod type (cylindrical bar type) may be used in place of the slab type. In this case, however, since the optical path cannot be zigzagged, the opposite end faces are usually cut perpendicularly to the longitudinal direction and are covered with AR coating.

For the above reasons, the slab-type laser crystal is employed in many of high-power solid-state laser oscillating devices. No matter whether the laser crystal is of the slab type or the rod type, a larger crystal makes it easier to obtain a high power. However, in general, crystals suitable for the laser crystal grow slowly in production, and the larger the crystal size, the more difficult it is to produce defect-free crystals. Consequently, a price of the laser crystal rises exponentially with increase in crystal size, to cause an increase in price of high-power solid-state laser oscillating devices.

DISCLOSURE OF INVENTION

An object of the present invention is to provide a solid-state laser oscillating device which is inexpensive and capable of obtaining a high power by using laser crystals of relatively small size.

A solid-state laser oscillating device of the present invention comprises a plurality of laser crystals arranged side by side along an axis of a laser beam to be output so that an optical contact between adjacent ones of said laser crystals is maintained, and exciting means for pumping the laser crystals. The optical contact between adjacent ones of the laser crystals can be achieved in various ways as follows:

(1) Adjacent laser crystals are so arranged as to be in direct surface contact with each other.

(2) Adjacent laser crystals are so arranged as to face each other with a narrow gap therebetween.

(3) A material having a low light absorbance is interposed between adjacent laser crystals. This is equivalent to an arrangement wherein the narrow gap is partly or entirely filled with a material having a low light absorbance in the above arrangement (2). The material of low light absorbance preferably has a refractive index substantially equal to that of the laser crystals.

(4) Adjacent laser crystals are connected with each other by an adhesive having a low light absorbance. This is equivalent to an arrangement wherein the material of low light absorbance is replaced by the adhesive, in the above arrangement (3). The adhesive preferably has a refractive index substantially equal to that of the laser crystals.

In all arrangements above, it is preferable that the end faces of the individual laser crystals are inclined so as to substantially satisfy the Brewster's condition with respect to the traveling direction of the laser beam. In the arrangements (3) and (4), however, where a material having a refractive index substantially equal to that of the laser crystals is filled between the adjacent laser crystals, the Brewster's condition need not be taken into account with regard to the inner end faces.

According to the present invention, effects similar to those achieved with a single laser crystal of relatively large size can be obtained by using a plurality of laser crystals of relatively small size. Specifically, by arranging laser crystals along an axis of a laser beam to be output so that they maintain mutual optical contact with each other, even though each of them is relatively small in size, it is possible to additively increase an effective length of a laser active medium of the entire solid-state laser oscillating device.

By arranging the adjacent laser crystals in direct close contact with each other or in confronting relation to each other with a sufficiently narrow gap therebetween, a satisfactory optical contact can be expected. Further, by interposing a material having a low light absorbance between the adjacent laser crystals, the reliability of optical contact can be secured. Using an adhesive having a low light absorbance as the material, mechanical coupling means for the laser crystals is provided at the same time. When a material having a refractive index substantially equal to that of the laser crystals is used as the low-absorbance material, an optical matching is improved between the material and the laser crystals, so that higher-quality optical contact can be obtained.

DETAILED DESCRIPTION OF THE PREFERRED EMBODIMENTS

Figure 1:
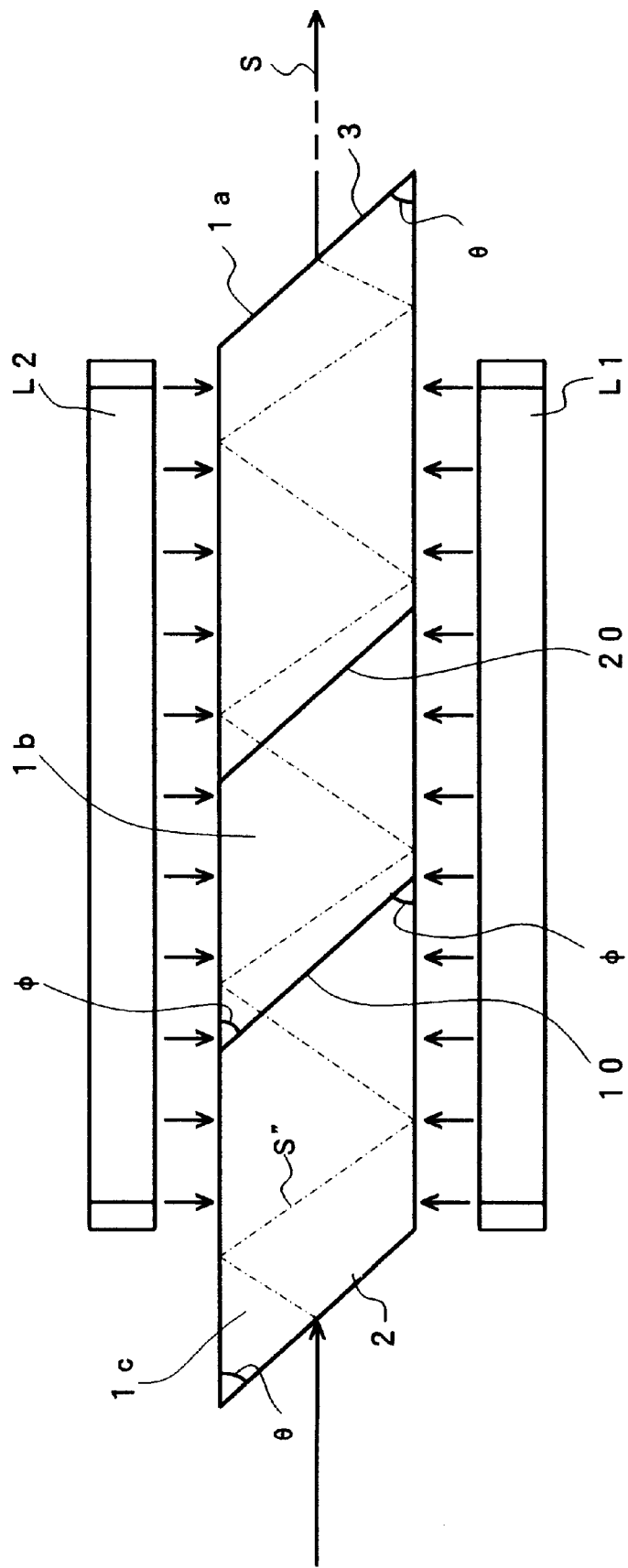
FIG. 1 is a schematic diagram showing the structure of a principal part of a laser oscillating device according to an embodiment of the present invention.

In view of the fact that the present invention is characterized by an arrangement of a plurality of laser crystals, FIG. 1 shows a principal structure of the laser oscillating device, especially focusing on the arrangement of the laser crystals. Also, with regard to parts other than the arrangement of the laser crystals (a structure of an optical resonator, a cooling water circulating mechanism, reflectors, a power supply for energizing excitation lamps, etc.), their structures, functions, etc. are not described again here.

Referring to FIG. 1, three laser crystals (YAG laser crystals or other types of laser crystals) $1a$, $1b$ and $1c$ are arranged along an optical axis of an optical resonator. In this embodiment, the laser crystals $1a$, $1b$ and $1c$ of a slab type and substantially equal in size are used, but rod-type laser crystals may be used instead. In general, the number of the laser crystals is arbitrary and the laser crystals used may not necessarily be of the same size.

Adjacent ones of the laser crystals, that is, $1a$ and $1b$, and $1b$ and $1c$, have surfaces facing each other with a thin adhesive layer 10, 20 interposed therebetween, respectively, and are so arranged as to form an array of laser crystals aligned in a straight line as a whole. Preferably, the individual end faces of the laser crystals $1a$ to $1c$ are subjected to high-precision surface polishing in order to prevent scattering of light. So as to minimize undesired reflections and thereby maintain a high laser beam power, it is preferable that the end faces of the laser crystals are inclined at an angle $\phi$ or $\theta$ approximately satisfying the Brewster's condition with respect to the light passing through the laser crystals. In the case where the adhesive layers 10 and 20 exist, the angle $\phi$ of the inclined surfaces of the adjacent laser crystals, which satisfies the Brewster's condition, is slightly different from the angle $\theta$ of the outer-end inclined faces of the laser crystal array, which also satisfies the Brewster's condition. This is a natural consequence of the fact that a refractive index of the medium (cooling water) surrounding the laser crystals $1a$ to $1c$ differs in general from that of the adhesive.

It is preferable that an adhesive having the smallest possible light absorbance with respect to the laser beam of oscillation wavelength or the excitation light is used for forming the adhesive layers 10 and 20. If a refractive index of the adhesive is substantially equal to that of the laser crystals $1a$ to $1c$ used, the optical matching is achieved so that undesired reflections are sufficiently suppressed without consideration to the Brewster's condition except for the outer ends of the laser crystal array.

In the case where the laser crystals $1a$ to $1c$ are fixed in position by some other means (e.g., by a suitable frame), it is not necessary to use adhesive. In this case, it is conceivable that a material substituting for the adhesive layers 10 and 20 may not be interposed between the adjacent laser crystals insofar as the adjacent laser crystals are held in surface contact with each other, but in cases where a narrow gap is present between the adjacent laser crystals, such a gap should preferably be filled with a material (liquid, semiliquid material, grease, etc.) which has the smallest possible light absorbance with respect to the laser beam of oscillation wavelength or the excitation light. If such material has a refractive index substantially equal to that of the laser crystals $1a$ to $1c$ used, the optical matching is achieved so that undesired reflections are sufficiently suppressed without consideration to the Brewster's condition, except for the outer ends of the laser crystal array, as in the aforesaid case of using the adhesive.

Figure 4:
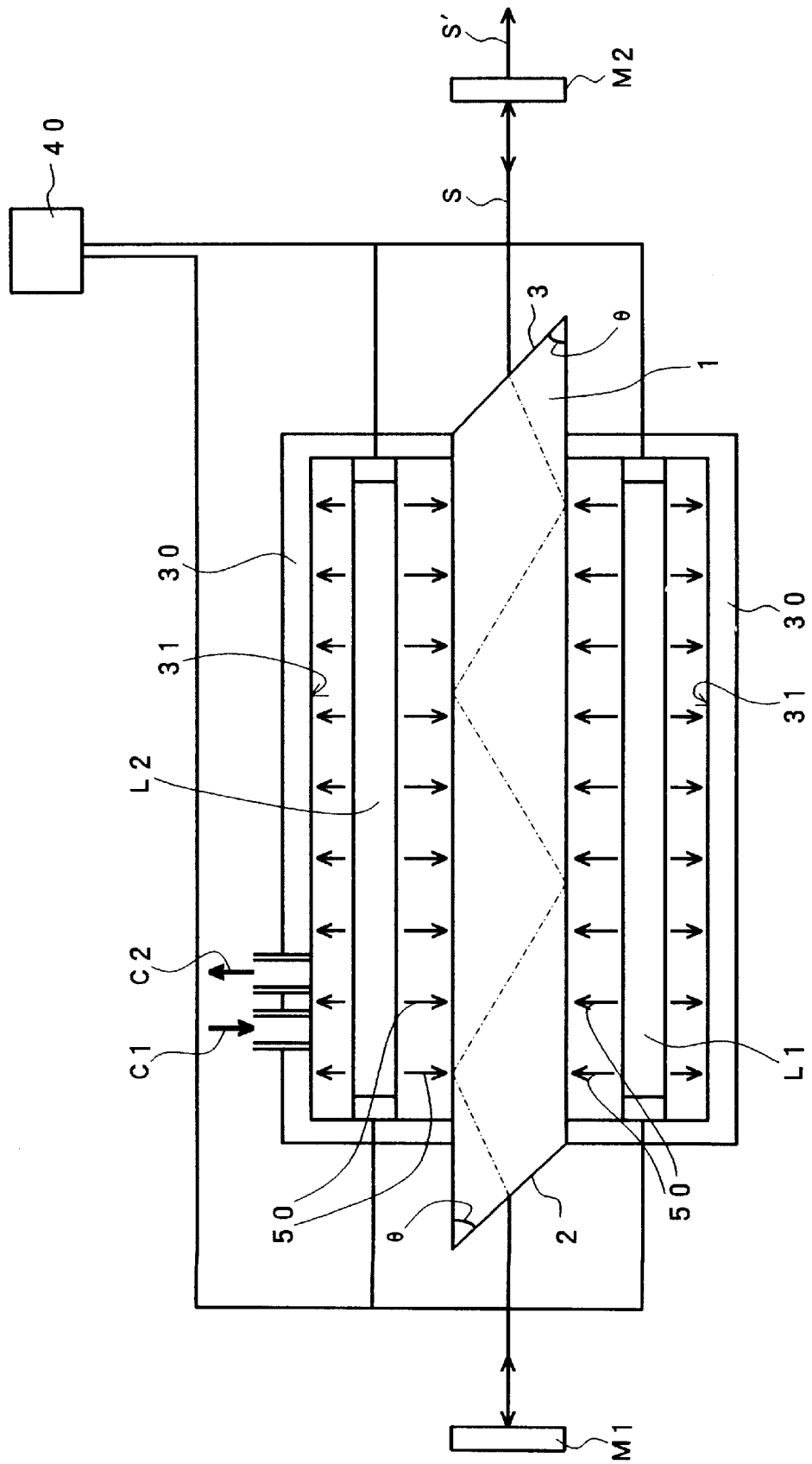
FIG. 4 is a schematic diagram showing the structure of a conventional slab-type YAG laser oscillating device.

In the example of FIG. 1, the one-dot-chain line S" represents an optical path of the output light S emitted in the lengthwise direction of the laser crystal array, and it indicates that a zigzag optical path is formed inside the slab-type laser crystals for the same reason and purpose as explained with reference to the case shown in FIG. 4. The advantage of the zigzag optical path is already described referring to FIG. 1.

Figure 2:
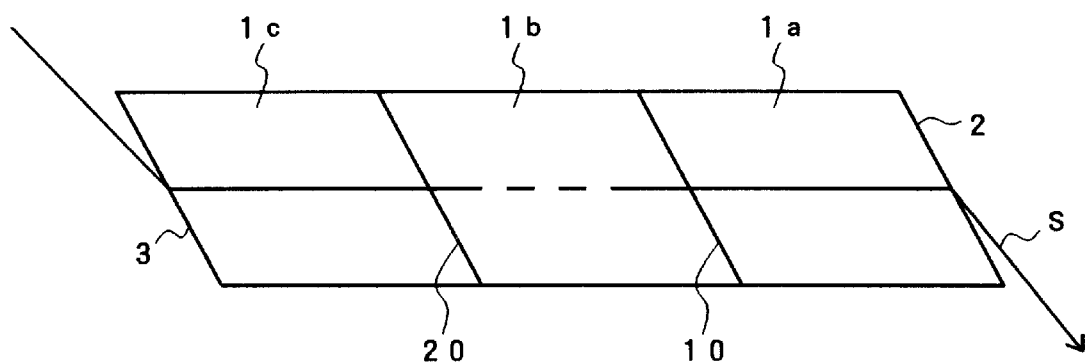
FIG. 2 is a schematic diagram showing the arrangement of a laser crystal array and an optical path, in which laser crystals at opposite ends of the array have outer end faces parallel to each other.
Figure 3:
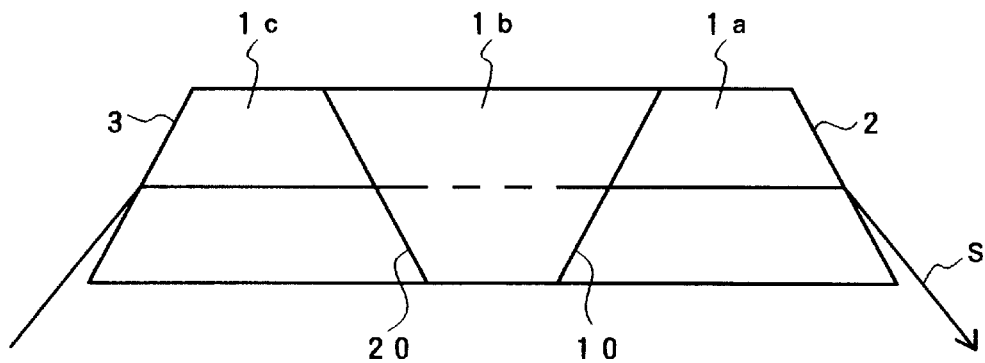
FIG. 3 is a schematic diagram showing the arrangement of a laser crystal array and an optical path, in which laser crystals at opposite ends of the array have nonparallel outer end faces.

In the case of using rod-type laser crystals, the opposite end faces (outer end faces of the outermost crystals) are perpendicularly cut and covered with AR coating because a zigzag optical path cannot be formed, as already explained. Alternatively, however, the outer end faces of the outermost crystals may be cut so as to satisfy the Brewster's condition without the AR coating being formed. In this case, care must be taken as to the relationship between the orientation of the individual laser crystals and the direction of the optical axis. Specifically, the direction in which the optical axis is deflected at the opposite ends of the laser crystal array varies depending on whether the outer end faces 2 and 3 of the outermost laser crystals 1*a* and 1*c* are made parallel to each other as shown in FIG. 2, or nonparallel as shown in FIG. 3 (in which the laser crystal array has a trapezoidal section). Therefore, the position and orientation of the individual reflection mirrors (cf. M1 and M2 in FIG. 4) constituting the optical resonator need to be adjusted in accordance with the direction of deflection of the optical axis.

Also in the case of using slab-type laser crystals, the laser crystals may be arranged in the manner shown in FIG. 2 or 3, however, in this case, the optical path cannot be formed in zigzag within the laser crystals.

No matter whether the laser crystals used are of the slab type or the rod type, if there is a gap between the end surfaces of adjacent laser crystals facing each other, a deviation of the optical axis (shift in position almost equivalent to the gap) can occur. Usually, however, this gap can be narrowed to a very small value, and thus the deviation of the optical axis would not be so large as to cause a problem. If the refractive indices are matched by the aforementioned method, then the deviation can of course be eliminated.

According to the present invention, without using a large-sized laser crystal which is difficult to produce and expensive, an equivalent laser output can be obtained by using multiple small-sized laser crystals which are easy to produce and inexpensive, to reduce the manufacturing costs of high-power solid-state laser oscillating devices.

What is claimed is:

1. A solid-state laser oscillating device to oscillate a laser beam in a resonator and to output the laser beam, comprising:

a plurality of laser crystals arranged in the resonator along an optical axis of the resonator to be united to cooperatively function substantially as a single laser crystal so that an optical contact between adjacent ones of said laser crystals is maintained; and exciting means for pumping said plurality of laser crystals.

2. A solid-state laser oscillating device according to claim 1, wherein the adjacent ones of said laser crystals are arranged in direct surface contact with each other.

3. A solid-state laser oscillating device according to claim 1, wherein the adjacent ones of said laser crystals are arranged so as to face each other with a narrow gap therebetween.

4. A solid-state laser oscillating device according to claim 3, wherein a material having a low light absorbance is interposed between the adjacent ones of said laser crystals.

5. A solid-state laser oscillating device according to claim 4, wherein said material having a low light absorbance has a refractive index substantially equal to that of said laser crystals.

6. A solid-state laser oscillating device according to claim 5, wherein outer end faces of laser crystals at the outermost position in said plurality of laser crystals are inclined at an angle substantially satisfying the Brewster's condition with respect to a traveling direction of an excited laser beam.

7. A solid-state laser oscillating device according to claim 3, wherein the adjacent ones of said laser crystals are connected to each other by an adhesive having a low light absorbance.

8. A solid-state laser oscillating device according to claim 7, wherein said adhesive has a refractive index substantially equal to that of said laser crystals.

9. A solid-state laser oscillating device according to claim 8, wherein outer end faces of laser crystals at the outermost position in said plurality of laser crystals are inclined at an angle substantially satisfying the Brewster's condition with respect to a traveling direction of an excited laser beam.

10. A solid-state laser oscillating device according to claim 1, wherein each end face of said plurality of laser crystals is inclined at an angle substantially satisfying the Brewster's condition with respect to a traveling direction of an excited laser beam.

11. A solid-state laser oscillating device comprising:

a plurality of laser crystals arranged side by side along an axis of a laser beam to be output to function as a single laser crystal so that an optical contact between adjacent ones of said laser crystals is maintained; and a pump pumping said plurality of laser crystals.

* * * * *